United States Patent
Gao et al.

(10) Patent No.: US 12,002,220 B2
(45) Date of Patent: Jun. 4, 2024

(54) METHOD OF IMAGE ACQUISITION BASED ON MOTION CONTROL SIGNAL ACCORDING TO ACQUISITION POSE

(71) Applicant: Beijing Sankuai Online Technology Co., Ltd., Beijing (CN)

(72) Inventors: Chunle Gao, Beijing (CN); Huaxia Xia, Beijing (CN); Hao Shen, Beijing (CN); Qiong Nie, Beijing (CN); Tiansi Han, Beijing (CN); Yiming Li, Beijing (CN); Jizhou Ma, Beijing (CN); Feipeng Tian, Beijing (CN); Binyang Hu, Beijing (CN); Mi Tian, Beijing (CN)

(73) Assignee: BEIJING SANKUAI ONLINE TECHNOLOGY CO., LTD., Beijing (CN)

( * ) Notice: Subject to any disclaimer, the term of this patent is extended or adjusted under 35 U.S.C. 154(b) by 327 days.

(21) Appl. No.: 17/671,592

(22) Filed: Feb. 15, 2022

(65) Prior Publication Data
US 2022/0366569 A1 Nov. 17, 2022

(30) Foreign Application Priority Data

May 13, 2021 (CN) .......................... 202110519528.X
May 13, 2021 (CN) .......................... 202121024642.7

(51) Int. Cl.
*H04N 13/282* (2018.01)
*G06T 7/215* (2017.01)
(Continued)

(52) U.S. Cl.
CPC .............. *G06T 7/215* (2017.01); *G06T 7/248* (2017.01); *G06T 7/80* (2017.01); *H04N 13/282* (2018.05)

(58) Field of Classification Search
CPC .................................................... H04N 13/282
See application file for complete search history.

(56) References Cited

U.S. PATENT DOCUMENTS 10,248,981 B1 * 4/2019 Dallas ............... G06Q 30/0643
2009/0213249 A1 8/2009 Ikeda
(Continued)

FOREIGN PATENT DOCUMENTS

CN 103973956 A 8/2014
CN 106101512 A 11/2016
(Continued)

OTHER PUBLICATIONS

State Intellectual Property Office of the People's Republic of China, Office Action and Search Report Issued in Application No. 202110519528X, Jun. 21, 2021, 15 pages. (Submitted with Machine/Partial Translation).

*Primary Examiner* — Jayanti K Patel
*Assistant Examiner* — Christopher Kingsbury Glover
(74) *Attorney, Agent, or Firm* — Kilpatrick Townsend & Stockton LLP

(57) ABSTRACT

An image acquisition method and apparatus are provided. By controlling a motion device, at least one of an image acquisition device or a photographed target object moves under the driving of the motion device, so that a sample image including the target object can be acquired in a preset designated acquisition pose after movement, thereby improving the accuracy of a relative pose between the image acquisition device and the target object during acquisition, reducing human intervention during acquisition, improving the automation degree, and providing the possibility for subsequent services that need to be performed according to sample images captured with relatively high shooting pose accuracy.

19 Claims, 5 Drawing Sheets

(51) Int. Cl.
G06T 7/246 (2017.01)
G06T 7/80 (2017.01)

(56) References Cited

U.S. PATENT DOCUMENTS

2016/0073095 A1* 3/2016 Ogura .................. H04N 13/221
    348/50
2016/0212412 A1* 7/2016 Cox ..................... G01B 5/0004
2017/0127045 A1    5/2017 Lin et al.
2017/0324947 A1* 11/2017 Bruce .................. H04N 13/296
2018/0324401 A1* 11/2018 Sheffield ................ H04N 23/60
2019/0123527 A1*  4/2019 Wagner ................ H02G 1/1256

FOREIGN PATENT DOCUMENTS

CN      111765350 A     10/2020
CN      112085650 A     12/2020

* cited by examiner

METHOD OF IMAGE ACQUISITION BASED ON MOTION CONTROL SIGNAL ACCORDING TO ACQUISITION POSE

CROSS-REFERENCE TO RELATED APPLICATIONS

This disclosure claims priority to the Chinese Patent Application No. CN202110519528.X and No. CN202121024642.7, filed with National Intellectual Property Administration, PRC on May 13, 2021, which are incorporated herein by reference in their entireties.

TECHNICAL FIELD

This disclosure relates to the field of automatic control, and in particular, to an image acquisition method and apparatus.

BACKGROUND

With the rapid development of imaging technology and the reduction of the costs of cameras, cameras are also used as common sensors to assist people in work and life by acquiring images.

In most cases, photographing may be performed by manually holding a camera in the hand and controlling a shutter. However, when a target object needs to be photographed at some specific angles and distances, the camera generally captures an image in a designated relative pose to the target object, to ensure that relevant services can be performed according to the acquired image including the target object.

For example, after machining a workpiece, it is necessary to measure an actual geometric parameter of the workpiece and calculate the machining error between the actual geometric parameter and a designed geometric parameter. In this case, image acquisition may be performed by using the to-be-measured workpiece as a target object, and the mapping of the to-be-measured actual geometric parameter in the image is determined, thereby replacing the direct measurement of the actual geometric parameter of the workpiece.

It can be learned that when acquisition needs to be performed in a designated relative pose, due to the inherent accuracy limitations of manual operations, it is difficult to implement the foregoing service requiring high shooting pose accuracy according to captured images.

SUMMARY

This disclosure provides an image acquisition method and apparatus, to partly resolve the problems in the related art.

The following technical solutions are adopted in this disclosure:

According to a first aspect, this disclosure provides an image acquisition method, including: obtaining a predetermined designated acquisition pose; determining a motion control signal according to the designated acquisition pose, and sending the motion control signal to a motion device configured to drive at least one of a target object or an image acquisition device to move, so that the motion device drives, in response to the motion control signal, at least one of the image acquisition device or the target object to move, and after movement of the at least one of the image acquisition device or the target object, the at least one of the image acquisition device or the target object reaches the designated acquisition pose indicated by the motion control signal; and sending an acquisition control signal to the image acquisition device, so that the image acquisition device captures, in response to the acquisition control signal, an image including the target object as a sample image corresponding to the designated acquisition pose.

According to a second aspect, this disclosure provides a non-transitory computer-readable storage medium storing a computer program, the computer program, when executed by a processor, being configured to implement the following operations: obtaining a predetermined designated acquisition pose; determining a motion control signal according to the designated acquisition pose, and sending the motion control signal to a motion device configured to drive at least one of a target object or an image acquisition device to move, so that the motion device drives, in response to the motion control signal, at least one of the image acquisition device or the target object to move, and after movement of the at least one of the image acquisition device or the target object, the at least one of the image acquisition device or the target object reaches the designated acquisition pose indicated by the motion control signal; and sending an acquisition control signal to the image acquisition device, so that the image acquisition device captures, in response to the acquisition control signal, an image including the target object as a sample image corresponding to the designated acquisition pose.

According to a third aspect, this disclosure provides an electronic device, including a memory, a processor, and a computer program stored in the memory and executable on the processor, the processor, when executing the program, being configured to implement the following operations: obtaining a predetermined designated acquisition pose; determining a motion control signal according to the designated acquisition pose, and sending the motion control signal to a motion device configured to drive at least one of a target object or an image acquisition device to move, so that the motion device drives, in response to the motion control signal, at least one of the image acquisition device or the target object to move, and after movement of the at least one of the image acquisition device or the target object, the at least one of the image acquisition device or the target object reaches the designated acquisition pose indicated by the motion control signal; and sending an acquisition control signal to the image acquisition device, so that the image acquisition device captures, in response to the acquisition control signal, an image including the target object as a sample image corresponding to the designated acquisition pose.

The at least one technical solution adopted in this disclosure can achieve the following beneficial effects: In the image acquisition method provided in this disclosure, by controlling the motion device, at least one of the image acquisition device or the photographed target object moves under the driving of the motion device, so that a sample image including the target object can be acquired in a preset designated acquisition pose after movement, thereby improving the accuracy of a relative pose between the image acquisition device and the target object during acquisition, reducing human intervention during acquisition, improving the automation degree, and providing the possibility for subsequent services that need to be performed according to sample images captured with relatively high shooting pose accuracy.

BRIEF DESCRIPTION OF THE DRAWINGS

Accompanying drawings described herein are used for providing further understanding about this disclosure, and constitute a part of this disclosure. Exemplary embodiments of this disclosure and descriptions thereof are used for explaining this disclosure, and do not constitute an inappropriate limitation on this disclosure. In the accompanying drawings.

DETAILED DESCRIPTION OF THE EMBODIMENTS

Based on the understanding of the foregoing problem, the embodiments in accordance with this disclosure provide an image acquisition method, in which at least one of an image acquisition device (may also be referred to as an image capture device) or a target object is driven to move by replacing the manual hand with a motion device, so that the image acquisition device captures, in a designated acquisition/capture pose, images including the target object.

To state the objectives, technical solutions, and advantages of this disclosure, the technical solutions in accordance with this disclosure will be described below with reference to specific embodiments and corresponding accompanying drawings. Apparently, the described embodiments are merely some but not all of the embodiments, and thus are not intended to be limiting. Based on the embodiments, all other embodiments obtained by a person of ordinary skill in the art without inventive efforts shall fall within the protection scope of this disclosure.

This disclosure provides an image acquisition method to control a motion device and an image acquisition device to implement image acquisition. The technical solutions provided in the embodiments are described in detail below with reference to the accompanying drawings.

Figure 1:
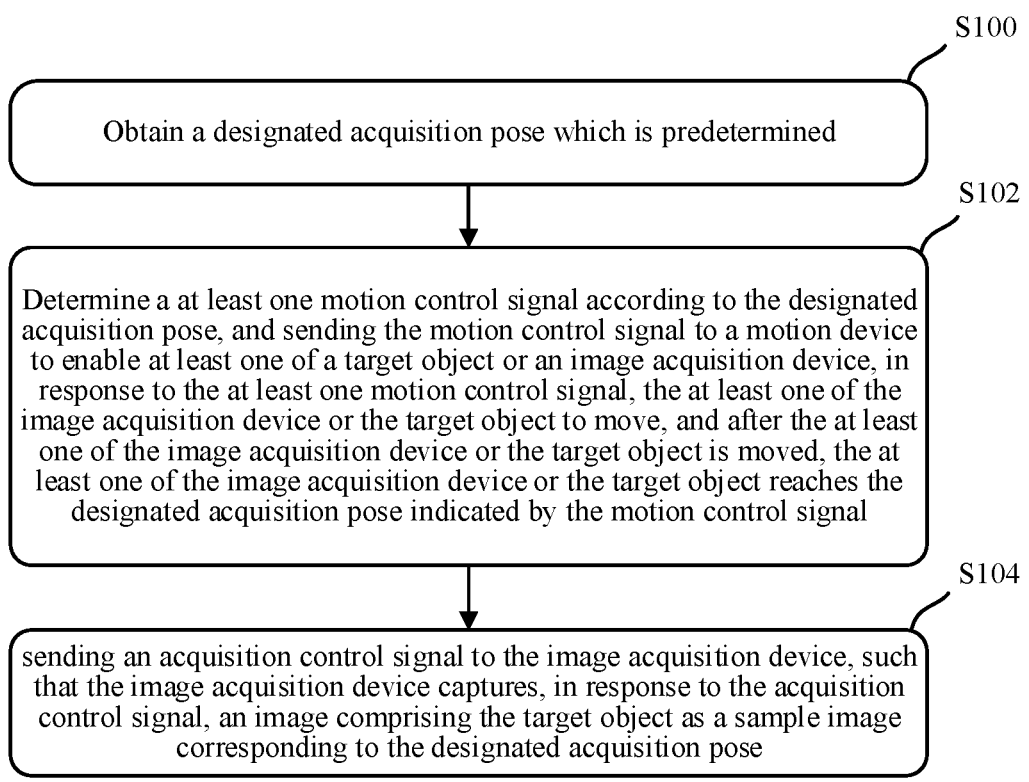
FIG. 1 is a schematic flowchart of an image acquisition method according to an embodiment of this disclosure.

FIG. 1 is a schematic flowchart of an image acquisition method according this disclosure. The method further includes steps S100 to S104.

S100: Obtain a predetermined designated acquisition pose.

An execution entity of the image acquisition method provided by this disclosure may be a server or a terminal device. When the execution entity is a server, the server includes a separate device or a system including a plurality of devices (such as a distributed server). When the execution entity is a terminal device, the execution subject may be an image acquisition device or a motion device, or may be another terminal device other than the image acquisition device and the motion device. Using another terminal device other than the image acquisition device and the motion device as an example, the terminal device can control the motion device and the image acquisition device and perform image acquisition, and therefore, the terminal device may be considered as a controller configured to control the motion device and the image acquisition device. It should be noted that, in some embodiments, the controller can communicate with the motion device and the image acquisition device in a wired or wireless manner, so as to control the motion device and the image acquisition device.

In some embodiments, a designated acquisition pose is predetermined. The designated acquisition pose may be a relative pose between the image acquisition device and the target object as a to-be-photographed object. That is, when a pose of the image acquisition device relative to the target object satisfies the designated acquisition pose, respective poses of the image acquisition device and the target object may not be specifically limited (as long as the relative pose between the image acquisition device and the target object satisfies the designated acquisition pose). If only one of the image acquisition device and the target object can move under the driving of the motion device, and the other is fixed in a specific pose, the designated acquisition pose may also be an absolute pose of the image acquisition device or the target object that can move, which is not limited in this disclosure.

In this embodiment, when an image including the target object is acquired in the predetermined designated acquisition pose, an obtained sample image corresponding to the designated acquisition pose includes image data required for performing subsequent services. In one embodiment, when the target object is a workpiece obtained by machining, and a geometric parameter for which the machining error is measured is a to-be-measured parameter of the workpiece, the acquired sample image includes image data corresponding to the to-be-measured parameter. In another embodiment, when the target object is a calibration object of a camera, a sample image including the calibration object is acquired and used for determining a calibration parameter of the camera.

For example, using a nut inner diameter as an example of the to-be-measured parameter, two-dimensional coordinates of pixels occupied by the nut inner diameter in the sample image may be measured, so that a nut inner diameter in the real world is determined according to an internal parameter and an external parameter of the image acquisition device, and the machining error of the nut inner diameter is obtained. In another example, the image acquisition device may alternatively capture, in the designated acquisition pose, a comparison image including a comparison workpiece in advance, and compare two-dimensional coordinates of pixels occupied by a nut inner diameter in the comparison image with the two-dimensional coordinates of the pixels occupied by the nut inner diameter in the sample image captured for a nut for which the machining error needs to be measured, to calculate the machining error of the nut inner diameter. It should be noted that, an inner diameter of a nut as the comparison workpiece in this example is considered as the same as a designed inner diameter.

S102: Determine a motion control signal according to the designated acquisition pose, and send the determined motion control signal to a motion device configured to drive at least one of a target object or an image acquisition device to move, so that the motion device drives, in response to the motion control signal, at least one of the image acquisition device or the target object to move, and after movement of the at least one of the image acquisition device or the target object, the at least one of the image acquisition device or the target object reaches the designated acquisition pose indicated by the motion control signal.

In this embodiment, the motion control signal sent to the motion device may be determined according to the designated acquisition pose. The motion device moves in a manner indicated by the motion control signal. After the motion device moves according to the received motion control signal, it can be considered that an actual relative pose (hereinafter referred to as actual pose) between the image acquisition device and the target object in a three-dimensional world coordinate system in this case is the designated acquisition pose corresponding to the motion control signal.

In some embodiments, the motion device may move as a whole according to the received motion control signal, or control at least some components of the motion device to actively move, and drive the image acquisition device and/or the target object connected to the motion device to move. The movement may include shift and rotation. The motion device may include merely a device that performs active motion, or may be a complete set of devices, for example, may include auxiliary parts such as guide rails and conveyor belts, as well as motion parts that implement active or passive motion according to the auxiliary parts, which are not limited in this disclosure.

The motion device may drive only one of the image acquisition device and the target object to move, and the other is fixed in a predetermined pose. In some embodiments, the motion device may drive the image acquisition device and the target object to move. When the motion device drives the image acquisition device and the target object to move, the motion device may simultaneously drive the image acquisition device and the target object to move, or the motion device may successively drive the image acquisition device and the target object to move. It is to be noted that, the motion device and each image acquisition device or target object driven by the motion device are arranged in a preset relative pose, and the relative pose does not change before and after movement.

It should be noted that, when the motion device drives only one of the image acquisition device and the target object to move, and the other is stationary, the motion control signal may only instruct the motion device how to move and enable the image acquisition device or the target object driven by the motion device reach a specific absolute pose after movement, and when moving to the absolute pose, a relative pose between the image acquisition device and the target object reaches the designated acquisition pose. When the motion device simultaneously drives the image acquisition device and the target object to move, in an embodiment of this disclosure, a part that drives the target object to move may be used as a first motion part, and a part that drives the image acquisition device to move is used as a second motion part. It should be noted that, "first" and "second" are only used for distinguishing the first motion part and the second motion part from each other, and the first motion part and the second motion part may be different types of parts respectively, or may be the same type of parts.

The first motion part and the second motion part may move independently under the control of the controller, that is, respectively drive the target object and the image acquisition device to move to specific absolute poses. In some embodiments, the first motion part and the second motion part may be two parts of the same motion system and move under inherent movement constraints between each other, that is, motion control signals received by the first motion part and the second motion part may indicate how to move to drive the target object and the image acquisition device so that a relative pose between the target object and the image acquisition device after movement is the designated acquisition pose. The absolute poses of both the target object and the image acquisition device are not limited. Alternatively, the motion device may be a complete set of devices, for example, may include auxiliary parts such as guide rails and conveyor belts, as well as motion parts that implement active or passive motion according to the auxiliary parts, which are not limited in this disclosure.

It should be noted that, the driven image acquisition device and/or the driven target object may reach the designated acquisition pose after movement within a maximum motion range of the motion device.

S104: Send an acquisition control signal to the image acquisition device, so that the image acquisition device captures, in response to the acquisition control signal, an image including the target object as a sample image corresponding to the current designated acquisition pose.

When the image acquisition device moves to the designated acquisition pose, an actual relative pose between the image acquisition device and the target object in the real world may be used as the current designated acquisition pose. In this case, the image acquisition device performs image acquisition according to the received acquisition control signal, and obtains an image including the target object acquired by the image acquisition device as the sample image corresponding to the current designated acquisition pose. It should be noted that, according to the predetermined designated acquisition pose, an image obtained by the image acquisition device during acquisition in each designated acquisition pose includes the target object.

Based on the image acquisition method shown in FIG. 1, by controlling the motion device, at least one of the image acquisition device or the photographed target object moves under the driving of the motion device, so that a sample image including the target object can be acquired in a preset designated acquisition pose after movement, thereby improving the accuracy of a relative pose between the image acquisition device and the target object during acquisition of the sample image, reducing human intervention during acquisition, improving the automation degree, and providing the possibility for subsequent services that need to be performed according to sample images captured with relatively high shooting pose accuracy.

It can be learned from the above descriptions that the sample image acquired by using the image acquisition method provided in this embodiment of this disclosure may be applied to subsequent services, and this disclosure does not limit what kind of services the sample image is subsequently used for. The sample image acquired by using the image acquisition method may be not only used for the measurement of the machining error of the workpiece described in the above, but also used for calibrating a parameter of a camera in an embodiment of this disclosure.

In some embodiments, during calibration of the parameter of the camera, the target object is a calibration object, and the parameter of the camera needs to be solved according to an image including the calibration object acquired by the camera and a relative pose between the camera and the calibration object when the camera captures the image including the calibration object. In this case, the image acquisition device may be the to-be-calibrated camera, and the target object is the calibration object. The calibration object, as an object of image acquisition, may include a calibration pattern used for providing calibration data for the acquired sample image. The calibration data is description data of feature information of the calibration object in the sample image. Specifically, the calibration data may be pixels occupied by the calibration object in a coordinate system (pixel coordinate system or picture coordinate system) established on a two-dimensional imaging plane.

After the to-be-calibrated camera captures, in the designated acquisition pose, the sample image including the calibration object, the parameter may be calibrated according to the sample image and the designated acquisition pose corresponding to the sample image. Compared with capturing an image by manually holding the camera in the hand, an actual pose between the camera and the calibration object during acquisition of the sample image may be considered as the designated acquisition pose, so as to ensure the consistency of poses used during camera calibration in the actual pose, thereby ensuring the accuracy of a calibrated camera parameter.

Some embodiments provide a system. The system may acquire a sample image under the control of a controller, and the system may include an image acquisition device, a target object, and a motion device. Further, the system may include a memory for storing the sample image acquired by the image acquisition device. The memory is another device independent of the image acquisition device, the target object, and the motion device, or may be arranged inside the image acquisition device or the motion device, which is not limited in this disclosure, but is only exemplary. The following of this disclosure is described by using an example in which the memory is arranged inside the image acquisition device.

Based on the above, the motion device and the image acquisition device may respectively and directly receive a motion control signal and an acquisition control signal sent by the controller. In one embodiment, the controller may be independent of the system described above. In this case, the controller may respectively send the motion control signal and the acquisition control signal to the motion device and the image acquisition device. In another embodiment, the controller may be alternatively used as a part of the system provided in this disclosure to control the image acquisition device, the motion device, and the memory included in the system. In this case, the system may include: the controller, the image acquisition device, the target object, the motion device, and the memory. Specifically, the controller is configured to send a motion control signal to the motion device according to the predetermined designated acquisition pose, so that the motion control device drives, in a case of receiving the motion control signal, the target object and/or the to-be-calibrated image acquisition device to move to the designated acquisition pose; the motion device is configured to drive, in a case of receiving the motion control signal, the target object and/or the to-be-calibrated image acquisition device to move to the designated acquisition pose; the image acquisition device is configured to perform image acquisition according to the received acquisition control signal, and use an acquired image including the target object as a sample image corresponding to the current designated acquisition pose; and the memory is configured to correspondingly store the sample image and the current designated acquisition pose after the image acquisition device performs image acquisition.

In this embodiment, the to-be-calibrated image acquisition device is used for acquiring the sample image. The to-be-calibrated image acquisition device may be an image acquisition device that is not calibrated before put into use, or may be an image acquisition device of which a parameter needs to be recalibrated after put into use for a time period. Any image acquisition device that needs to be calibrated may be the to-be-calibrated image acquisition device in this disclosure, which is not limited herein. In addition, the image acquisition device may be applied to image acquisition in any field, for example, may be installed on a mobile phone as a camera of the mobile phone, or may be installed on an unmanned device as an acquisition device of the unmanned device, which is not limited in this disclosure.

In this embodiment, a calibration plate may be selected as the target object, and the calibration plate is regarded as a two-dimensional plane object with a known size that includes a calibration pattern. The calibration pattern may be a checkerboard pattern including square patterns in two colors arranged at intervals.

In this embodiment of this disclosure, there may be a plurality of target objects, and correspondingly, sample images captured by the image acquisition device may include at least one sample image including a plurality of target objects. More abundant calibration data can be obtained by acquiring the sample image including a plurality of target objects, thereby improving the acquisition efficiency of sample images. Because the target objects may be arranged in a preset relative pose, a pose constraint relationship among the target objects may be determined according to the relative pose during subsequent calibration, thereby improving the accuracy of parameter calibration.

The controller may obtain the predetermined designated acquisition pose and sends the motion control signal to the motion device according to the designated acquisition pose.

Generally, the designated acquisition pose is pose data used in a process of performing subsequent services, and the motion control signal is sent to the motion device according to the designated acquisition pose to instruct the motion device to move. It is understood that, after the motion device moves according to the received motion control signal, it can be considered that an actual pose between the image acquisition device and the target object in a three-dimensional world coordinate system in this case is the designated acquisition pose corresponding to the motion control signal.

The controller may respectively send a first motion control signal and a second motion control signal to a first motion part and a second motion part of the motion device according to the designated acquisition pose, to instruct the first motion part to drive the target object to move to a target object pose, and instruct the second motion part to drive the image acquisition device to move to a second pose, so that a relative pose between the image acquisition device and the target object after movement is the current designated acquisition pose.

In this embodiment, in order to expand a motion range of the motion device, the motion device may include a motion part and a motion restriction part. The motion restriction part may be fixedly arranged at a predetermined position, and the motion part may be connected to the target object loaded by the motion part and/or the image acquisition device. Without separating from the motion restriction part, the motion part may move, according to the received motion control signal, along the motion restriction part and/or control at least some components of the motion part to move, so as to drive the load to move. In an embodiment of this disclosure, the motion part and the load driven by the motion part are fixed in a predetermined relative pose. For example, the motion part may be connected to the load by clamping the load, and the relative pose between the motion part and the load does not change before and after the motion part drives the load to move.

Figure 2A:
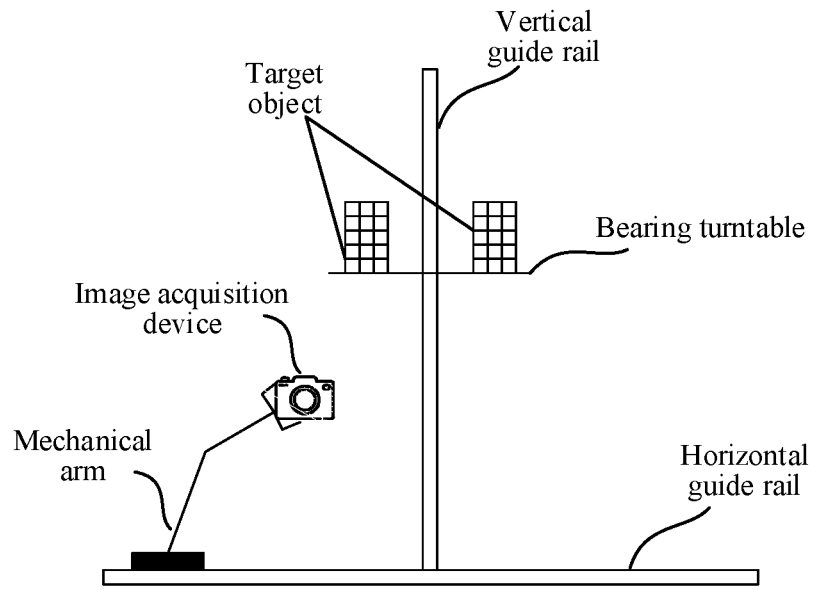
FIG. 2A is a schematic diagram of a system according to an embodiment of this disclosure.
Figure 2B:
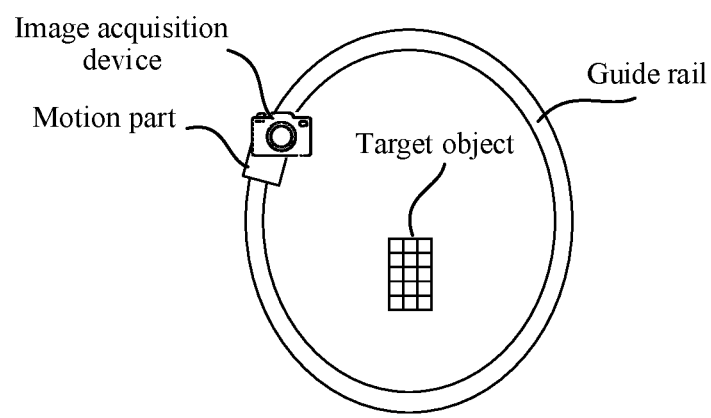
FIG. 2B is a schematic diagram of a system according to another embodiment of this disclosure.
Figure 2C:
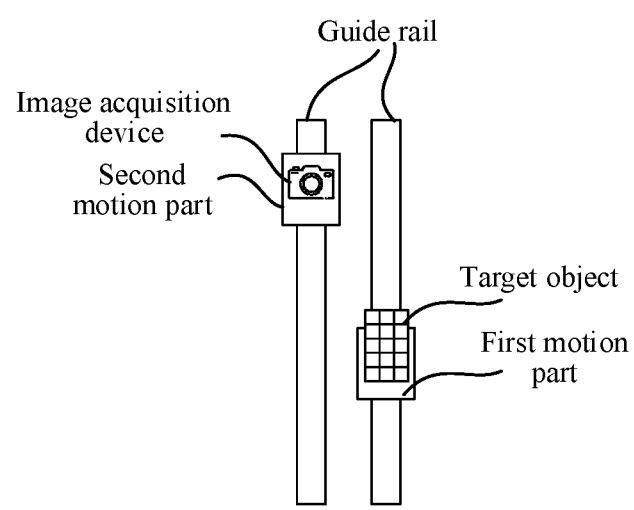
FIG. 2C is a schematic diagram of a system according to still another embodiment of this disclosure.
Figure 3:
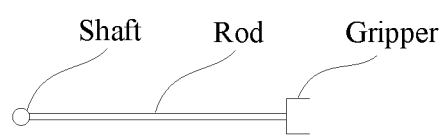
FIG. 3 is a schematic diagram of a motion device according to this disclosure.

Exemplarily, as shown in FIG. 2A, when the motion restriction part is a horizontal guide rail and a vertical guide rail, and the motion part is a mechanical arm and a bearing turntable, the mechanical arm may move along the horizontal guide rail as a whole, or may move or rotate through a link and a joint part. The bearing turntable may move along the vertical guide rail or may rotate around a rotation shaft, thereby driving the image acquisition device and/or the target object to move. In addition to the horizontal guide rail and the vertical guide rail provided in FIG. 2A, the motion restriction part may be alternatively an annular guide rail as shown in FIG. 2B. The motion part that drives the image acquisition device to move may move along the annular guide rail. Similarly, the motion part may be alternatively double guide rails as shown in FIG. 2C. The double guide rails respectively restrict the first motion part that drives the target object and the second motion part that drives the image acquisition device to move along the guide rails. It can be learned that the motion part may move in various preset trajectories through arrangement of the guide rails, which is not described in this disclosure again. In another example, as shown in FIG. 3, when the motion part is a rotating rod and the motion restriction part is a shaft of the rotating rod, the rotating rod may include a rod and a rotatable gripper connected to the rod. The motion part may drive, by using the gripper, the image acquisition device and/or the target object to rotate.

Further, the motion part may include a control subpart, a support subpart, and a movable subpart. The control subpart is configured to send an overall motion control signal to the support subpart and/or a local motion control signal to the movable subpart according to the received motion control signal. Both the support subpart and the movable subpart include signal receivers and drivers that provide power for movement. The support subpart cooperates with the motion restriction part, is configured to support the movable subpart, and drives, according to the received overall motion control signal, the motion part to move along the motion restriction part. The movable subpart is connected to the load (the image acquisition device and/or the target object), and is configured to drive, according to the received local motion control signal, the load connected to the movable subpart to move to the designated acquisition pose. Using FIG. 3 as an example, when the motion part is a rotating rod, the control subpart may be implemented as a processor in the rotating rod, the support subpart includes a signal receiver and a rod of a driver that provides power for movement, and the movable subpart includes a signal receiver and a gripper of the driver that provides power for movement.

As shown in FIG. 2A, in this embodiment, the motion device may simultaneously drive the target object and the image acquisition device to move. The motion device includes a first motion part and a second motion part. The target object is driven by a bearing turntable of the first motion part, and the image acquisition device is driven by a mechanical arm of the second motion part. The motion restriction part is guide rails, including a horizontal guide rail and a vertical guide rail. According to a motion mode of the bearing turntable, the motion restriction part may further include a rotation shaft (not shown in FIG. 2A) of the bearing turntable. Further, the second motion part further includes a support subpart and a movable subpart. The support subpart may be a base of the mechanical arm, and the movable subpart may be a link and a joint part of the mechanical arm. Each movable part of the mechanical arm may be connected to, through clamping, the image acquisition device and/or the target object driven by the mechanical arm, and moves or rotates through the link and the joint of the mechanical arm. Alternatively, the mechanical arm may be driven to move as a whole by controlling the base to move along the guide rail, so that the image acquisition device and/or the target object connected to the mechanical arm is driven to move.

When the motion device includes the first motion part that drives the target object to move and the second motion part that drives the image acquisition device to move, both the first motion part and the second motion part are motion parts. Only one of the first motion part and the second motion part may include the control subpart, the support subpart, and the movable subpart, or both the first motion part and the second motion part may include control subparts, support subparts, and movable subparts. When both the first motion part and the second motion part include control subparts, support subparts, and movable subparts, the support subparts of the first motion part and the second motion part may be the same or different.

It should be noted that, the control subpart may send, according to each received motion control signal, the motion control signal to only one of the support subpart and the movable subpart, or may respectively send an overall motion control signal and a local motion control signal to the support subpart and the movable subpart. That is, according to each motion control signal, only one of the support subpart and the movable subpart may perform the foregoing movement, or the support subpart and the movable subpart may perform the foregoing movement simultaneously or successively, which is not limited in this disclosure. Exemplarily, according to the designated acquisition pose included in the received motion control signal, the control subpart may first send an overall motion control signal to the support subpart to instruct the support subpart to move to a position corresponding to the overall motion control signal, and then send a local motion control signal to the movable subpart to instruct the movable subpart to drive the load to move to a pose corresponding to the local motion control signal. In this case, the load reaches the designated acquisition pose included in the motion control signal after movement.

In some embodiments, the current designated acquisition pose and the corresponding sample image may be stored in the memory under the condition of retaining a correspondence, as reference data for performing subsequent services.

In an embodiment of this disclosure, after driving the target object and/or the image acquisition device to move to the designated acquisition pose, in response to the received motion control signal, the motion device returns a motion completion signal to the controller. After a signal receiver included in the controller receives the motion completion signal, a signal transmitter included in the controller sends an acquisition control signal to the image acquisition device to instruct the image acquisition device to acquire an image including the target object. It can be considered that the controller includes at least a signal transmitter for sending signals to the motion device and the image acquisition device. Further, the controller may include a signal receiver for receiving the motion completion signal returned by the motion device.

When the motion device simultaneously drives the target object and the image acquisition device to move, a part that drives the target object to move may be used as the first motion part, and a part that drives the image acquisition device to move is used as the second motion part. When the target object is not unique, the first motion part may simultaneously drive a plurality of target objects to move. Certainly, each target object and the first motion part are fixed in a predetermined relative pose, and the relative pose remains unchanged before and after movement.

In an embodiment, when the motion device includes the first motion part that drives the target object to move and the second motion part that drives the image acquisition device to move, both the first motion part and the second motion part are motion parts. Only one of the first motion part and the second motion part may move under the restriction of the motion restriction part, and another may move away from the motion restriction part. Alternatively, both the first motion part and the second motion part may be arranged to move under the restriction of the motion restriction part. In this case, the first motion part and the second motion part may move under the restriction of the same or different motion restriction components, which is not limited in this disclosure.

In this embodiment of this disclosure, the foregoing system may further include a calibration device for calibrating a parameter of the image acquisition device according to the sample image acquired by the image acquisition device and a designated acquisition pose corresponding to the sample image.

It should be noted that, based on the control of the motion device, this disclosure respectively provides the following three sample image acquisition methods:

According to the first method, a first motion control signal is sent to the first motion part, and a second motion control signal is sent to the second motion part, so that the first motion part and the second motion part drive, respectively in response to the received first motion control signal and the received second motion control signal, the target object and the image acquisition device to move, and the target object and the image acquisition device reach designated acquisition poses indicated by the first motion control signal and the second motion control signal after movement. That is, a relative pose between the target object and the image acquisition device reaches the designated acquisition pose.

According to the second method, a first motion control signal is sent to the first motion part, so that the first motion part drives, in response to the received first motion control signal, the target object to move, and the target object reaches a designated acquisition pose indicated by the first motion control signal after movement. That is, a relative pose between the target object and the image acquisition device reaches the designated acquisition pose.

According to the third method, a second motion control signal is sent to the second motion part, so that the second motion part drives, in response to the received second motion control signal, the image acquisition device to move, and the image acquisition device reaches a designated acquisition pose indicated by the second motion control signal after movement. That is, a relative pose between the target object and the image acquisition device reaches the designated acquisition pose.

After instructing the relative pose of the target object and/or the image acquisition device to reach the designated acquisition pose after movement through any one of the above methods, an acquisition control signal may be sent to the image acquisition device, to instruct the image acquisition device to acquire, at the designated acquisition pose, a sample image including the target object. In any one of the above methods, before and after the second motion part drives the image acquisition device to move, a relative pose between the second motion part and the image acquisition device remains the same as a pre-arranged relative pose. Similarly, before and after the first motion part drives the target object to move, a relative pose between the second motion part and the target object remains the same as a pre-arranged relative pose. It should be noted that, when the first motion part drives a plurality of target objects to move, before and after movement, a relative pose between the first motion part and each of the target objects remains the same as a pre-arranged relative pose, and the first motion part is arranged in a manner in which a relative pose between the first motion part and each target object connected to the first motion part remains the same as a pre-arranged relative pose.

Based on FIG. 2A, this disclosure exemplarily provides a sample image acquisition method. Specifically, according to a predetermined designated acquisition pose, the controller may send a second motion control signal to the second motion part (a mechanical arm), and send a first motion control signal to the first motion part (a bearing turntable) to instruct the second motion part to drive the image acquisition device to a second pose according to the second motion control signal, and instruct the first motion part to drive the target object to a first pose according to the first motion control signal. In this case, a relative pose between the image acquisition device in the second pose and the target object in the first pose is the current designated acquisition pose. The controller may send an acquisition control signal to the image acquisition device to instruct the image acquisition device to acquire a sample image corresponding to the current designated acquisition pose. Subsequently, the current designated acquisition pose is redetermined according to the predetermined designated acquisition pose. In this case, the image acquisition device remains unchanged in the second pose, and the first pose is redetermined according to the second pose and the redetermined current designated acquisition pose. A first motion control signal is sent to the first motion part again according to the redetermined first pose, to instruct the first motion part to drive the target object to the redetermined first pose according to the re-sent first motion control signal, so as to reach the current designated acquisition pose, and the image acquisition device is controlled to acquire a sample image.

Certainly, in the above case, the target object may be instructed to remain unchanged in the first pose after the current designated acquisition pose is redetermined, and the second pose is redetermined for the image acquisition device according to the redetermined current designated acquisition pose, to instruct the image acquisition device to move to the redetermined second pose under the driving of the second motion part and acquire a sample image according to the acquisition control signal, which is not limited in this disclosure.

A person skilled in the art may understand that to improve the accuracy of services to be performed, a plurality of sample images are generally captured for the same target object in various designated acquisition poses. For example, during the measurement of the machining error of the nut inner diameter, the nut inner diameter may be photographed at a plurality of distances and angles, and the machining error of the nut inner diameter may be calculated according to a plurality of obtained sample images. For example, the nut inner diameter may be calculated according to each of the sample images and may be determined according to the nut inner diameters calculated according to the sample images. For example, an average value of the nut inner diameters calculated according to the sample images may be used as the nut inner diameter. Therefore, according to the image acquisition method provided by this disclosure, after a sample image corresponding to a designated acquisition pose is acquired each time, the sample image may be added to an image set, thereby obtaining an image set including a plurality of sample images.

In some embodiments, the sample image corresponding to the current designated acquisition pose may be added to an image set stored in the memory. Specifically, the image acquisition method provided in this embodiment of this disclosure may further include: adding the sample image corresponding to the current designated acquisition pose to an image set to obtain an image set meeting a predesignated service condition, and using sample images in the image set meeting the service condition as service images.

Based on the above, when there are diverse requirements for the sample images in the image set in subsequent services, for example, when the nut inner diameter is determined according to the sample images including the nut inner diameter captured at different distances and angles, the accuracy of a determined value of the inner diameter can be improved. In an embodiment of this disclosure, it can be determined whether the image set meets the predesignated service condition. Only when the image set meets the predesignated service condition, it can be considered that the sample images in the image set comprehensively and uniformly display the target object, and therefore, subsequent services can be performed according to the sample images included in the image set.

Figure 4:
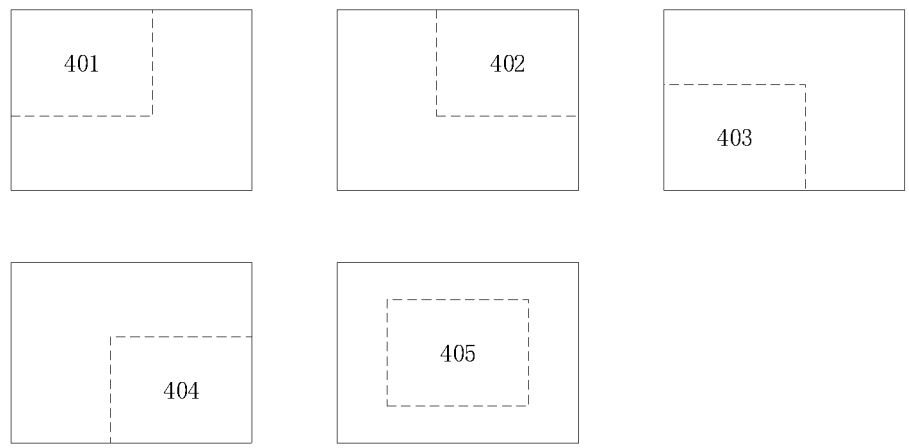
FIG. 4 is a schematic diagram of distribution positions according to this disclosure.

It should be noted that, for an image set, whether sample images in the image set comprehensively and uniformly display the target object may be determined from different aspects. For example, the predesignated service condition may include at least one of a region distribution condition, a proportion distribution condition, or an pose distribution condition. The region distribution condition is used for determining whether the target object is uniformly distributed in regions in the sample images, the proportion distribution condition is used for determining whether areas occupied by the target object in the sample images are uniformly distributed in range intervals, and the pose distribution condition is used for determining whether the sample images comprehensively and uniformly describe angles of the target object. Further, whether the image set meets the predesignated service condition may be further determined in the following manner:

The region distribution condition: Whether the image set meets the region distribution condition can be determined according to whether the target object is uniformly distributed in preset regions of the sample images. For example, the quantities of sample images in which the included target object is distributed in the preset regions may be counted, and the sample distribution is considered to be uniform in a case that a variance of the quantities of sample images in which the target object is distributed in the preset regions does not exceed a preset first variance threshold, that is, the region distribution condition is met. It may be alternatively determined whether the quantity of sample images in which the target object is distributed in each of the preset regions reaches a preset lower limit of a quantity, and when the quantity of sample images in which the target object is distributed in each preset region reaches the preset lower limit of the quantity, the region distribution condition is met. Specific values of the first variance threshold and the lower limit of the quantity are not limited in this disclosure. Exemplarily, the preset regions may be shown in FIG. 4. Imaging image screens of the image acquisition device are classified into five regions 401, 402, 403, 404, and 405 defined by dotted lines in FIG. 4. The quantity of sample images with the target object in the region 401 in the image set, the quantity of sample images with the target object in the region 402 in the image set, the quantity of sample images with the target object in the region 403 in the image set, the quantity of sample images with the target object in the region 404 in the image set, and the quantity of sample images with the target object in the region 405 in the image set are determined, and whether the image set meets the region distribution condition is further determined based on the quantities.

The proportion distribution condition: During determination of whether region proportions of the target object in the sample images are uniformly distributed in region proportion intervals, region proportion intervals of a plurality of sample images may be preset, and a specific region proportion interval that the sample image belongs to may be determined according to a region proportion of the target object in the sample image. Whether the image set meets the proportion distribution condition is determined according to the quantities of sample images corresponding to the region proportion intervals. For example, the quantities of sample images in which the region proportions of the target object in the sample images fall within region proportion intervals of 0% to 40%, 40% to 70%, and 70% to 100% may be counted, and whether the quantities of sample images corresponding to the region proportion intervals are uniformly distributed is determined in any manner (such as solving a variance of the quantities of sample images corresponding to the region proportion intervals). When the variance of the quantities of sample images corresponding to the region proportion intervals does not exceed a preset second variance threshold, it is considered that the proportion distribution condition is met. In an example, a specific pixel quantity interval that a sample image belongs to may be also determined according to the quantity of pixels occupied by the target object in the sample image, and whether the image set meets the proportion distribution condition is determined according to the quantity of sample images corresponding to each pixel quantity interval. When the quantity of sample images corresponding to each pixel quantity interval exceeds a preset first quantity threshold, it is considered that the image set meets the proportion distribution condition. It can be learned that there are various criteria for determining whether the image set meets the proportion distribution condition, which is not described in this disclosure again.

The pose distribution condition: Determination may be performed according to relative poses between sample images and the image acquisition device when the image acquisition device captures the sample images. For example, a specific preset pose interval that a sample image belongs to may be determined according to a relative pose between the sample image and the image acquisition device when the image acquisition device captures the sample image. Whether the image set meets the pose distribution condition is determined according to the quantity of sample images corresponding to each preset pose interval. When the quantity of sample images corresponding to each preset pose interval exceeds a preset second quantity threshold, it is considered that the image set meets the pose distribution condition. Alternatively, whether the image set meets the pose distribution condition is determined according to whether a variance of the quantities of sample images corresponding to the preset pose intervals meets a preset third variance threshold. When the variance of the quantities of sample images corresponding to the preset pose intervals is less than the preset third variance threshold, it is considered that the image set meets the pose distribution condition.

It should be noted that, statistic collection may be performed on the foregoing three determining conditions intuitively according to the sample images, the three determining conditions may further be determined according to designated acquisition poses when the image acquisition device captures the sample images. For example, a larger distance between the image acquisition device and the target object indicates a smaller region occupied by the target object in a sample image acquired by the image acquisition device.

When the image set meets the above three service conditions at the same time, subsequent services may be performed according to the sample images in the image set. Alternatively, a corresponding weight may be set for each service condition, and whether the image set meets the service conditions is determined according to a weighted result. This is not limited in this disclosure.

A person skilled in the art may understand that, during acquisition of the sample images, the way in which the target object distributes in the sample images is related to only the relative poses between the image acquisition device and the target object when the image acquisition device captures the sample images. Apparently, if the predetermined designated acquisition pose is updated by using the designated acquisition poses corresponding to the each sample image in the image set meeting the service condition, the image set meeting the service condition may be used as a target image set in next acquisition of sample images including another target object, the predetermined designated acquisition pose is updated according to designated acquisition poses corresponding to sample images in the target image set, and image acquisition is performed for another target object by using the updated designated acquisition pose, so as to ensure that an image set formed by acquired sample images including another target object meets the same service condition as the target image set.

In this case, when the image set does not meet the service condition, the image set needs to be adjusted, for example, the sample images included in the image set may be increased or deleted.

In an embodiment of this disclosure, when the image set does not meet the service condition, the current designated acquisition pose may be redetermined according to the predetermined designated acquisition pose, and the image acquisition device is controlled to reacquire a sample image according to the current designated acquisition pose and add the sample image to the image set, until the image set meets the service condition. Certainly, because a specific sample image that the image set requires to meet the service condition is known during each time it is determined whether the image set meets the service condition, a designated acquisition pose in which the image acquisition device can acquire the sample image required by the image set may be redetermined as a next current designated acquisition pose, so that the image set meets the service condition can be obtained faster.

In some embodiments, before the sample image corresponding to the current designated acquisition pose is added to the image set, a difference between the sample image and the image set may be determined. Specifically, the difference may represent a difference between a description of the target object by the sample image and a description of the sample image by the image set, and whether to add the sample image to the image set may be determined according to the difference. A larger difference indicates a higher probability that the sample image is added to the image set. Some embodiments provide a method for determining the difference between the sample image corresponding to the current designated acquisition pose and the image set. Specifically, for each sample image in the image set, a first difference between the sample image corresponding to the current designated acquisition pose and the each sample image is determined; a second difference between the sample image corresponding to the current designated acquisition pose and the image set is determined according to the first differences between the sample image corresponding to the current designated acquisition pose and the sample images in the image set; whether to add the sample image corresponding to the current designated acquisition pose to the image set is determined according to the second difference between the sample image corresponding to the current designated acquisition pose and the image set; the sample image corresponding to the current designated acquisition pose is added to the image set if the second difference between the sample image corresponding to the current designated acquisition pose and the image set is greater than or equal to a preset difference threshold; and the sample image corresponding to the designated acquisition pose is not added to the image set if the second difference between the sample image corresponding to the current designated acquisition pose and the image set is less than the preset difference threshold.

The first difference between the sample image corresponding to the current designated acquisition pose and each sample image in the image set may be determined in any way. For example, the first difference may be determined according to a difference between a preset region in which the target object is located in the sample image corresponding to the current designated acquisition pose and a preset region in which the target object is located in each sample image in the image set, and the second difference may be determined according to a variance of all the first differences. The first difference and the second difference may be determined in various manners, which is not limited in this disclosure. Furthermore, when the sample image corresponding to the current designated acquisition pose is not added to the image set, a motion control signal may be sent to the motion device, so that the motion device drives the image acquisition device and/or the target object to move again and captures an image in a next current designated acquisition pose.

In an embodiment of this disclosure, the sample images include at least one multi-target image, and the multi-target image includes at least two target objects.

The above describes the image acquisition method provided by one or more embodiments of this disclosure. Based on the same idea, this disclosure further provides a corresponding image acquisition apparatus as shown in FIG. 5.

Figure 5:
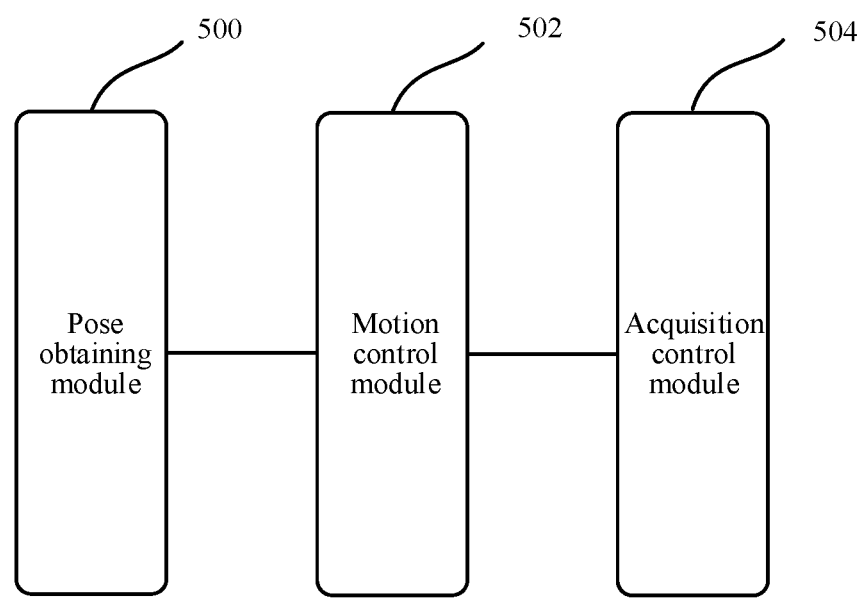
FIG. 5 is a schematic diagram of an image acquisition apparatus according to this disclosure.

FIG. 5 is a schematic diagram of an image acquisition apparatus according to this disclosure. The apparatus includes: a pose obtaining module, a motion control module, and an acquisition control module.

The pose obtaining module 500 is configured to obtain a predetermined designated acquisition pose.

The motion control module 502 is configured to determine a motion control signal according to the designated acquisition pose, and send the motion control signal to a motion device configured to drive at least one of a target object or an image acquisition device to move, so that the motion device drives, in response to the motion control signal, at least one of the image acquisition device or the target object to move, and after movement of the at least one of the image acquisition device or the target object, the at least one of the image acquisition device or the target object reaches the designated acquisition pose indicated by the motion control signal.

The acquisition control module 504 is configured to send an acquisition control signal to the image acquisition device, so that the image acquisition device captures, in response to the acquisition control signal, an image including the target object as a sample image corresponding to the designated acquisition pose.

In some embodiments, the motion device includes a first motion part configured to drive the target object to move and a second motion part configured to drive the image acquisition device to move; and the motion control module 502 is further configured to send a first motion control signal to the first motion part; and send a second motion control signal to the second motion part, where the first motion part and the second motion part drive, respectively in response to the received first motion control signal and the received second motion control signal, the target object and the image acquisition device to move, and enable the target object and the image acquisition device to reach designated acquisition poses indicated by the first motion control signal and the second motion control signal after movement.

In some embodiments, the motion device includes a first motion part configured to drive the target object to move; and the motion control module 502 is further configured to send the motion control signal to the first motion part, where the first motion part drives, in response to the received motion control signal, the target object to move and enables the target object to reach the designated acquisition pose indicated by the motion control signal after movement.

In some embodiments, the motion device includes a second motion part configured to drive the image acquisition device to move; and the motion control module 502 is further configured to send the motion control signal to the second motion part, where the second motion part drives, in response to the received motion control signal, the image acquisition device to move and enables the image acquisition device to reach the designated acquisition pose indicated by the motion control signal after movement.

In some embodiments, the acquisition control module 504 is further configured to add the sample image corresponding to the designated acquisition pose to an image set to obtain an image set meeting a predesignated service condition.

In some embodiments, before the sample image corresponding to the designated acquisition pose is added to the image set, the acquisition control module 504 is further configured to, for each sample image in the image set, determine a first difference between the sample image corresponding to the designated acquisition pose and the each sample image; determine a second difference between the sample image corresponding to the designated acquisition pose and the image set according to the first differences between the sample image corresponding to the designated acquisition pose and the sample images in the image set; and add the sample image corresponding to the designated acquisition pose to the image set in response to determination that the second difference is greater than or equal to a preset difference threshold.

In some embodiments, the predesignated service condition includes at least one of a region distribution condition, a proportion distribution condition, or an pose distribution condition.

In some embodiments, the acquisition control module 504 is further configured to, updating the designated acquisition pose by using designated acquisition poses corresponding to the each sample image in the image set.

In some embodiments, sample images captured by the image acquisition device include at least one multi-target image, and the multi-target image includes at least two target objects.

This disclosure further provides a non-transitory computer-readable storage medium, storing a computer program, the computer program being configured to implement the foregoing image acquisition method.

Figure 6:
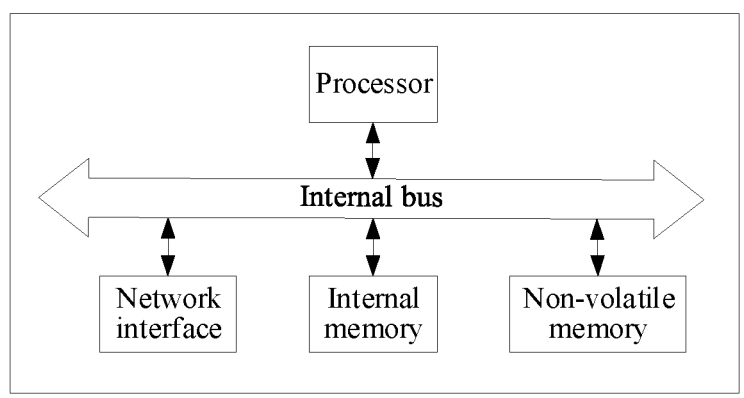
FIG. 6 is a schematic structural diagram of an electronic device corresponding to FIG. 1 according to this disclosure.

This disclosure further provides a schematic structural diagram of an electronic device shown in FIG. 6. Referring to FIG. 6, at a hardware level, the electronic device includes a processor, an internal bus, an internal memory, and a non-volatile memory, and may certainly further include hardware required for other services. The processor reads a corresponding computer program from the non-volatile storage into the memory and then runs the computer program to implement the image acquisition method.

Definitely, in addition to a software implementation, this disclosure does not exclude other implementations, for example, a logic device or a combination of software and hardware. In other words, an entity executing the following processing procedure is not limited to the logic units, and may also be hardware or logic devices.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity specifically, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this disclosure, the functions of the units may be implemented in the same piece of or a plurality of pieces of software and/or hardware.

A person skilled in the art should understand that the embodiments of the present invention may be provided as a method, a system, or a computer program product. Therefore, the present invention may be in a form of complete hardware embodiments, complete software embodiments, or embodiments combining software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should be further noted that the term "include," "comprise," or any other variants are intended to cover a non-exclusive inclusion, so that a process, a method, a commodity, or a device that includes a series of elements not only includes such elements, but also includes other elements not expressly listed, or further includes elements inherent to such a process, method, commodity, or device. Unless otherwise specified, an element limited by "include a/an . . . " does not exclude other same elements existing in the process, the method, the article, or the device that includes the element.

A person skilled in the art should understand that some embodiments may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may also be implemented in a distributed computing environment in which tasks are performed by remote processing devices connected by using a communication network. In a distributed computing environment, the program module may be located in both local and remote computer storage media including storage devices.

Some embodiments are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely embodiments of this disclosure, and are not intended to limit this disclosure. For a person skilled in the art, various modifications and changes may be made to this disclosure. Any modifications, equivalent replacements, and improvements made within the spirit and principle of this disclosure shall fall within the scope of the claims of this disclosure.

The invention claimed is:

1. An image acquisition method, comprising:
obtaining a predetermined designated acquisition pose;
determining at least one motion control signal according to the designated acquisition pose;
sending the at least one motion control signal to a motion device to enable the motion device to drive, in response to the at least one motion control signal, at least one of the image acquisition device or a target object, wherein after the at least one of the image acquisition device or the target object is moved, the at least one of the image acquisition device or the target object reaches the designated acquisition pose indicated by the motion control signal, wherein the motion device comprises a motion part and a motion restriction part, the motion part comprises a first motion part and a second motion part, wherein the motion restriction part comprises a guide rail, and the first motion part is one of a mechanical arm and a bearing turntable and the second motion part is another of a mechanical arm and a bearing turntable; and
sending an acquisition control signal to the image acquisition device to enable the image acquisition device to capture, in response to the acquisition control signal, an image comprising the target object as a sample image corresponding to the designated acquisition pose.

2. The method according to claim 1, wherein the first motion part configured to drive the target object to move and the second motion part configured to drive the image acquisition device to move; and, wherein
sending the at least one motion control signal to the motion device to enable the motion device to drive, in response to the motion control signal, at least one of the image acquisition device or a target object to move comprises:
sending a first motion control signal contained in the motion control signal to the first motion part; and
sending a second motion control signal contained in the motion control signal to the second motion part, wherein the first motion part drives, in response to the first motion control signal, the target object to move, the second motion part drives, in response to the second motion control signal, the image acquisition device to move, and after movements of the image acquisition device and the target object, the image acquisition device and the target object reach designated acquisition poses indicated by the first motion control signal and the second motion control signal.

3. The method according to claim 1, wherein the first motion part configured to drive the target object to move; and, wherein
sending the at least one motion control signal to the motion device to enable the motion device to drive, in response to the motion control signal, at least one of the image acquisition device or a target object to move comprises:
sending the at least one motion control signal to the first motion part, wherein the first motion part drives, in response to the received motion control signal, the target object to move and enables the target object to reach the designated acquisition pose indicated by the motion control signal after movement.

4. The method according to claim 1, wherein the second motion part configured to drive the image acquisition device to move; and
sending the at least one motion control signal to the motion device to enable the motion device to drive, in response to the motion control signal, at least one of the image acquisition device or a target object to move comprises:
sending the at least one motion control signal to the second motion part, wherein the second motion part drives, in response to the received motion control signal, the image acquisition device to move and enables the image acquisition device to reach the designated acquisition pose indicated by the motion control signal after movement.

5. The method according to claim 1, further comprising:
adding the sample image corresponding to the designated acquisition pose to an image set to obtain an image set meeting a predesignated service condition.

6. The method according to claim 5, wherein before adding the sample image corresponding to the designated acquisition pose to the image set, the method further comprises:
for each sample image in the image set, determining a first difference between the sample image corresponding to the designated acquisition pose and each sample image in the image set;
determining a second difference between the sample image corresponding to the designated acquisition pose and the image set, according to the first differences between the sample image corresponding to the designated acquisition pose and each sample image in the image set; and
adding the sample image corresponding to the designated acquisition pose to the image set in response to determining that the second difference is greater than or equal to a preset difference threshold.

7. The method according to claim 5, wherein the predesignated service condition comprises at least one of region distribution condition, proportion distribution condition, or pose distribution condition.

8. The method according to claim 5, further comprising:
updating the designated acquisition pose by using designated acquisition poses corresponding to each sample image in the image set.

9. The method according to claim 1, wherein sample images captured by the image acquisition device comprise at least one multi-target image, and the multi-target image comprises at least two target objects.

10. The method according to claim 1, wherein
the motion restriction part is configured to limit the motion part to move in a preset motion trajectory, and
in response to receiving the motion control signal, the motion part moves along the motion restriction part and/or controls at least some components of the motion part to move, to drive at least one of the image acquisition device or the target object to move to the designated acquisition pose.

11. The method according to claim 10, wherein the motion part comprises a control subpart, a support subpart, and a movable subpart, wherein
the control subpart is configured to send an overall motion control signal to the support subpart and/or a local motion control signal to the movable subpart according to the received motion control signal,
the support subpart cooperates with the motion restriction part, is configured to support the movable subpart, and drives, according to the received overall motion control signal, the motion part to move along the motion restriction part, and
the movable subpart is connected to at least one of the image acquisition device or the target object, and is configured to drive, according to the received local motion control signal, the at least one of the image acquisition device or the target object connected to the movable subpart to move to the designated acquisition pose.

12. The method according to claim 1, wherein the first motion part configured to drive the target object to move and the second motion part configured to drive the image acquisition device to move, wherein
the first motion part is configured to drive, in response to a received motion control signal, the target object to move, the second motion part is configured to drive, in response to a received motion control signal, the image acquisition device to move, and a relative pose between the target object and the image acquisition device is the designated acquisition pose after movements.

13. The method according to claim 1, wherein the first motion part is the bearing turntable, the second motion part is the mechanical arm, and wherein
the motion restriction part comprises a horizontal guide rail and a vertical guide rail, and is configured to limit the second motion part to move in a preset motion trajectory.

14. A non-transitory computer-readable storage medium, storing a computer program such that when the computer program is executed by a processor, the processor is caused to perform:
obtaining a predetermined designated acquisition pose;
determining at least one motion control signal according to the designated acquisition pose;
sending the motion control signal to a motion device to enable the motion device to drive, in response to the at least one motion control signal, the at least one of the image acquisition device or the target object to move, wherein after the at least one of the image acquisition device or the target object is moved, the at least one of the image acquisition device or the target object reaches the designated acquisition pose indicated by the motion control signal, wherein the motion device comprises a motion part and a motion restriction part, the motion part comprises a first motion part and a second motion part, wherein the motion restriction part comprises a guide rail, and the first motion part is one of a mechanical arm and a bearing turntable and the second motion part is another of a mechanical arm and a bearing turntable; and
sending an acquisition control signal to the image acquisition device to enable the image acquisition device to capture, in response to the acquisition control signal, an image comprising the target object as a sample image corresponding to the designated acquisition pose.

15. An electronic device, comprising a memory, a processor, and a computer program stored in the memory and executable by the processor such that when computer program is executed by the processor, the processor is caused to perform:
obtaining a predetermined designated acquisition pose;
determining at least one motion control signal according to the designated acquisition pose;
sending the at least one motion control signal to a motion device to enable the motion device to drive, in response to the at least one motion control signal, the at least one of the image acquisition device or the target object to move, wherein after the at least one of the image acquisition device or the target object is moved, the at least one of the image acquisition device or the target object reaches the designated acquisition pose indicated by the motion control signal, wherein the motion device comprises a motion part and a motion restriction part, the motion part comprises a first motion part and a second motion part, wherein the motion restriction part comprises a guide rail, and the first motion part is one of a mechanical arm and a bearing turntable and the second motion part is another of a mechanical arm and a bearing turntable; and
sending an acquisition control signal to the image acquisition device to enable the image acquisition device to capture, in response to the acquisition control signal, an image comprising the target object as a sample image corresponding to the designated acquisition pose.

16. The electronic device according to claim 15, wherein the processor is further caused to perform:
adding the sample image corresponding to the designated acquisition pose to an image set to obtain an image set meeting a predesignated service condition.

17. The electronic device according to claim 16, wherein before adding the sample image corresponding to the designated acquisition pose to an image set, the processor is caused to perform:
For each sample image in the image set, determining a first difference between the sample image corresponding to the designated acquisition pose and each sample image in the image set;
Determining a second difference between the sample image corresponding to the designated acquisition pose and the image set, according to the first differences between the sample image corresponding to the designated acquisition pose and each sample image in the image set; and
adding the sample image corresponding to the designated acquisition pose to the image set in response to determining that the second difference is greater than or equal to a preset difference threshold.

18. The electronic device according to claim 16, wherein the predesignated service condition comprises at least one of region distribution condition, proportion distribution condition, or pose distribution condition.

19. The electronic device according to claim 16, wherein the processor is further caused to perform:

updating the designated acquisition pose by using designated acquisition poses corresponding to each of the sample images in the image set.

\* \* \* \* \*